(12) United States Patent
Will et al.

(10) Patent No.: US 12,025,566 B2
(45) Date of Patent: Jul. 2, 2024

(54) METHOD AND DEVICE FOR INSPECTING CONTAINERS

(71) Applicant: KRONES AG, Neutraubling (DE)

(72) Inventors: Christof Will, Obertraubling (DE); Stefan Piana, Koefering (DE); Peter Lindner, Langquaid (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/966,921

(22) PCT Filed: Dec. 21, 2018

(86) PCT No.: PCT/EP2018/086481
§ 371 (c)(1),
(2) Date: Aug. 3, 2020

(87) PCT Pub. No.: WO2019/185185
PCT Pub. Date: Oct. 3, 2019

(65) Prior Publication Data
US 2021/0048395 A1    Feb. 18, 2021

(30) Foreign Application Priority Data
Mar. 29, 2018 (DE) ..................... 10 2018 107 689.4

(51) Int. Cl.
*G01N 21/90* (2006.01)

(52) U.S. Cl.
CPC ......... *G01N 21/90* (2013.01); *G01N 21/9009* (2013.01)

(58) Field of Classification Search
CPC ........................... G01N 21/90; G01N 21/9009
See application file for complete search history.

(56) References Cited

U.S. PATENT DOCUMENTS 3,930,994 A * 1/1976 Conway ................ B07C 5/3416
209/579
4,476,981 A * 10/1984 Yoshida ................. B07C 5/361
209/653
(Continued)

FOREIGN PATENT DOCUMENTS

CA    2764192 A1    7/2013
CN    101493425 A   7/2009
(Continued)

OTHER PUBLICATIONS

1 International Search Report dated Mar. 14, 2019 for PCT/EP2018/086481.
(Continued)

*Primary Examiner* — Tri T Ton
*Assistant Examiner* — Jarreas Underwood
(74) *Attorney, Agent, or Firm* — Schmeiser, Olsen & Watts, LLP (57) ABSTRACT

Provided is a method for inspecting containers, wherein the containers are conveyed along a predetermined transport path by a transport device and wherein an image recording device takes at least one locally resolved inspection image of at least one area of the containers during transport of the containers. A triggering of the inspection image recording of this locally resolved image is controlled, wherein this controlling takes place in consideration of a triggering image recording of an image of the container.

23 Claims, 2 Drawing Sheets

(56) References Cited

U.S. PATENT DOCUMENTS

| | | | | |
|---|---|---|---|---|
| 5,105,149 | A * | 4/1992 | Tokura | G01R 31/308 |
| | | | | 348/126 |
| 5,361,912 | A * | 11/1994 | Krieg | B07C 5/3408 |
| | | | | 209/582 |
| 6,275,603 | B1 | 8/2001 | Cronshaw et al. | |
| 6,661,911 | B1 * | 12/2003 | Ishikura | B07C 5/361 |
| | | | | 198/339.1 |
| 7,622,691 | B2 * | 11/2009 | De Greef | B07C 5/36 |
| | | | | 209/912 |
| 8,711,350 | B2 * | 4/2014 | Motter | B65C 9/40 |
| | | | | 356/240.1 |
| 9,842,408 | B2 * | 12/2017 | Milne | G01N 15/1475 |
| 10,497,092 | B2 * | 12/2019 | Koren | H04N 23/56 |
| 11,501,244 | B1 * | 11/2022 | Hill | G06K 7/1413 |
| 2008/0175456 | A1 * | 7/2008 | Ioannou | G06T 7/0004 |
| | | | | 382/131 |
| 2008/0291438 | A1 | 11/2008 | Akkerman et al. | |
| 2011/0234790 | A1 * | 9/2011 | True | G01N 21/6489 |
| | | | | 348/126 |
| 2013/0155220 | A1 * | 6/2013 | Mahuna | G06F 3/04847 |
| | | | | 348/86 |
| 2013/0271755 | A1 * | 10/2013 | Lindner | G01N 21/90 |
| | | | | 356/240.1 |
| 2015/0308898 | A1 | 10/2015 | Lindner | |
| 2017/0091706 | A1 * | 3/2017 | Lloyd | G06Q 10/0833 |
| 2017/0102531 | A1 * | 4/2017 | Hashimoto | G02B 26/105 |
| 2018/0270465 | A1 * | 9/2018 | Bendall | G01N 21/954 |
| 2019/0137410 | A1 * | 5/2019 | Valkonen | G01N 29/14 |
| 2019/0222810 | A1 * | 7/2019 | Horiguchi | G06T 7/0004 |
| 2020/0098122 | A1 * | 3/2020 | Dal Mutto | G06T 17/00 |
| 2022/0341069 | A1 * | 10/2022 | Cohen | G06T 7/0004 |

FOREIGN PATENT DOCUMENTS

| | | |
|---|---|---|
| CN | 102713579 A | 10/2012 |
| CN | 107621469 A | 1/2018 |
| CN | 107635677 A | 1/2018 |
| DE | 30 36 502 A1 | 5/1982 |
| DE | 32 22 904 A1 | 1/1983 |
| DE | 43 05 559 A1 | 8/1994 |
| DE | 10 2009 020 921 A1 | 11/2010 |
| DE | 10 2011 083 757 A1 | 4/2013 |
| DE | 10 2014 220 598 A1 | 4/2016 |
| DE | 10 2015 106 013 A1 | 10/2016 |
| DE | 102016112159 A1 | 1/2018 |
| WO | 2014204993 A1 | 12/2014 |
| WO | 2017211974 A1 | 12/2017 |
| WO | 2018007215 A1 | 1/2018 |

OTHER PUBLICATIONS

International Search Report dated Mar. 14, 2019 for PCT/EP2018/086481.

Chinese Office Action for Application No. 201880091926.2, dated Apr. 2, 2022.

* cited by examiner

METHOD AND DEVICE FOR INSPECTING CONTAINERS

CROSS-REFERENCE TO RELATED APPLICATIONS

This application claims priority to PCT Application No. PCT/EP2018/086481, having a filing date of Dec. 21, 2018, based on German Application No. 10 2018 107 689.4, having a filing date of Mar. 29, 2018, the entire contents both of which are hereby incorporated by reference.

FIELD OF TECHNOLOGY

The following relates to a method and an apparatus for inspecting containers. Such methods and apparatuses have long been known from the conventional art. Usually, containers are transported, in particular individually, by a transport device. During this transport these containers are observed by cameras, in order to detect certain characteristics such as incorrectly attached labels, defects in the mouth of the containers or in the bottom as well.

Hence, embodiments of this invention relate to machines with video systems, in particular in the field of beverage producing industry which serves for inspecting, controlling, driving, alignment and/or sorting of containers or unit packs. Besides, embodiments of this invention also relate to sensors for controlling machine and system functions. Examples include, as mentioned above, bottom, mouth or sidewall inspections in an empty container inspection facility. In addition, however, embodiments of the invention can also be used in controlling of label sealing or filling level, for example after a filling or labeling machine or in the field of container sorting, such as prior to a cleaning machine.

Such machines usually have, apart from the transport device and the image recording device, several trigger systems, such as light barrier systems which are used in order to ensure that an image recording of the containers is triggered at a right moment. In an embodiment known from the conventional art it is also known to trigger an image recording directly by a trigger unit (and in conjunction with a light barrier). The disadvantage of this approach is that such a trigger or light barrier unit requires assembly space, that is in particular assembly space upstream of the image recording device. In addition, the trigger unit or its individual sensors must be connected to the transport device and in particular must be wired. In addition, this trigger unit usually also has a mechanism and one or more sensors and thus leads to a cost factor in purchase and installation. Besides, the individual sensors also require readjustment and in particular also a regular cleaning.

Due to wear, for example due to the elongation of a transport chain, usually also the parameters of such a tracking system must be readjusted in order to maintain a proper triggering. In addition, the sensor devices may fail due to, for example, a defect or a lack of cleaning, thereby paralyzing the production of an entire plant.

Furthermore, the trigger unit requires in many cases a height adjustment, for example, to always perform the triggering at different container heights at the optimum vertical position.

Alternatively, it would also be conceivable to provide a plurality of sensors at different heights or to install a vertical trigger light grid. In a trivial case, in which, for example, no rotary encoder for driving the transport device is provided, beyond also an adjustment in the transport direction is required, for example to align or receive containers of different diameters in different production modes positionally correct to their center plane.

Furthermore, the trigger signal generation, the delay of the trigger signal in the trigger unit and the signal transmission generate the trigger uncertainty via the trigger unit, that means the image recording is not triggered at every single container exactly at the set target position, but also shortly before or shortly thereafter. While some applications of these inspection machines are tolerant towards 1 mm trigger uncertainty, others require very high trigger accuracy of significantly less than 1 mm. Due to steadily increasing production speeds, these problems are exacerbated even further.

SUMMARY

An aspect relates to being able to dispense with such trigger systems or at least to simplify them in the case of such methods and apparatuses. It is also an aspect of embodiments of the invention to reduce or completely eliminate the above-mentioned disadvantages in particular with regard to operating costs, assembly space and trigger uncertainty.

In a method according to embodiments of the invention for inspecting containers, the containers are transported by a transport device along a predetermined transport path. Here, at least one first image recording device records a spatially resolved image of at least one area of the container or the containers during transport of the containers. According to embodiments of the invention, a triggering of the inspection image recording of the spatially resolved image is controlled, wherein this controlling takes place under consideration of a triggering image recording of an image of the container.

It is therefore proposed in contrast to the conventional art that the image triggering is not controlled or triggered by a trigger control, including one or more trigger sensors such as a light barrier, but the triggering takes place by recording a further image, in particular of the same container. Thus, it is possible that initially a trigger image recording of the container is performed, in particular in order to detect a position of the container in this way and on the basis of this information the inspection image recording is triggered.

Therefore, the trigger image recording is performed in order to detect a position of the container and in particular a position in the transport direction The trigger image recording is performed on the same container as the inspection image recording. The trigger image recording is performed prior to the inspection image recording.

A time interval between the trigger image recording and the inspection image recording may be less than 5 ms, less than 2 ms, less than 1 ms, or less than 500 µs. The time interval between the trigger image recording and the inspection image recording may be greater than 0.1 µs, or greater than 0.5 µs.

The trigger image recordings are repeated and/or triggered cyclically, wherein an inspection image recording is triggered only when the container to be inspected is depicted in the trigger image in a predefined manner and in particular in an optimal manner for position determination. Otherwise, there is no reaction and in particular no triggering of an image recording. One way to achieve this, is that the cycle (or the refresh rate) of the trigger image recording is short enough to optimally depict each container at least once. For example, if containers are to be transported on a single lane conveyor at a speed of 2.0 m/s and the depiction of the containers in the trigger image recordings are not to be offset by more than 10 mm from image to image, the cycle should not take longer than 5 ms then.

The cyclical trigger image recording can be either free-running, i. e. the camera takes the next trigger image always at the next possible point in time, wherein the predetermined maximum time for an optimum depiction must never be exceeded, or it can take place in a fixed pattern in a time controlled or path controlled manner.

The cycle or the refresh rate of the recording of the trigger images may be selected such that the depiction of the containers in the trigger image recordings from image to image has an offset of less than 30 mm, less than 20 mm, or particularly less than 10 mm.

At least two trigger image recordings are performed. In particular, at least two trigger image recordings are performed per each container to be recorded. A plurality of trigger image recordings are performed (in particular per each container to be recorded) and in particular a plurality of trigger image recordings in particular cyclically repeated.

The trigger image recordings may be recorded with a cycle or a refresh rate of less than 40 ms, less than 30 ms, less than 20 ms, or less than 10 ms.

The trigger images are stored at least temporarily. The trigger images are recorded and/or stored with at least one marking information.

This marking information can be an information which is characteristic for a point in time of the image recording and/or a location of the container and/or a position of the transport device. This marking information can be information which uniquely identifies the point in time of the trigger image recording and/or the location of the container and/or the position of the transport device.

Furthermore, it would also be possible for the trigger images to be recorded with indexing information, such as a serial number for each trigger image.

In a further embodiment, the camera and/or light source is switched off after effected inspection recording for a predetermined area or time period, and in particular a time period in which, due to mechanical reasons, no new container can be present for a new sequence of trigger and inspection image recordings. The idle period between the inspection image recording and the renewed trigger image recording is slightly smaller than the time between the image recording positions of two containers being spaced as closely as possible.

In a further method, the inspection image recording serves for inspecting at least an area of the container, in particular an inspection which is selected from a group of inspections which contains a side wall inspection, a bottom inspection, a mouth inspection, a closure inspection, combinations thereof and the like. In a further embodiment, the containers are conveyed along a straight-line transport path. A corresponding device may for example have a single or multi-lane conveyor, in particular a single-lane conveyor, on which the containers are arranged in a predetermined orientation, in particular standing.

The containers are also moved substantially synchronously, in particular synchronously to a transport chain or to a conveyor belt.

Furthermore, at least temporarily a position of a drive device of the transport device is detected. On the basis of this position of the drive device conclusions can be drawn regarding a position of the transport device and/or the containers and this information in turn can be used for a triggering of the trigger image recording and thus used for the final inspection image recording.

A corresponding apparatus described in more detail below can, for example, have a rotary pulse encoder which in particular is arranged on the transport device, and which submits as a signal a corresponding number of path increments, for example depending on a movement of a chain or a conveyor belt. A processor device can also be provided which calculates a number of path increments.

Furthermore, a trigger unit submits a trigger signal in particular when a container is transported past. In this case, a trigger unit may be provided. In the context of embodiments of the invention, this trigger unit has in particular an image recording device, particularly as explained below the same image recording device as that one which also serves for the recording of the inspection image. This trigger unit submits particularly a trigger signal during the transport of the containers.

In addition, a detection device can be provided, which is able to detect both stationary and horizontal containers.

The containers are generally in particular bottles or beverage bottles made of glass or plastic, beverage cans or secondary packaging such as crates or outer packaging made of cardboard.

In addition, detection devices for detecting beverage cans may also be provided. These may be, for example, inductive proximity sensors.

In an embodiment, a tracking unit is also provided which delays generated trigger signals, for example by a predetermined number of path increments. In this case, for example, an image recording can be controlled and/or triggered as a function of the trigger image recorded by the image recording device. In this case, such a unit may be arranged in the image recording device itself, or else in an external tracking controller. In particular, when containers of different diameters and/or in different production sorts are to be triggered in a positionally correct manner relative to their central axis, adaptation to a container diameter can be effected by a different number of path increments.

The images are recorded by a camera, which has one or more industrial cameras, which are each configurated with an imaging optics for image recording. In this case, this recording can be triggered by a trigger signal, which can originate from the same image recording device.

Furthermore, as described in more detail below, the containers are illuminated for the purpose of their inspection. A corresponding device may have a illumination device. As described in greater detail below, this illumination device can provide continuous light or can also be switched. In addition, a continuous light can be provided, which is switched off, for example, during prolonged inactivity of a camera.

Furthermore, it is also conceivable that triggering is performed accurately concerning height and the respective container and also synchronously to the image recording.

In this case, an illumination trigger may be provided which is either in turn controlled by the image recording or the image recording device and the illumination can both process trigger signals with small delay, that is, in particular in a range of a few microseconds and are controlled by the trigger signal.

Furthermore, it is also possible that the illumination can be done in different arrangements depending on the task and can also deliver light of different types. So, it may, as mentioned in more detail below, be a reflected light, a transmitted light or a dark field.

In addition, it would also be conceivable that several types of illumination or exposure times are combined with each other.

In a further embodiment, an image evaluation system is provided, which receives the images of an image recording device, for example via a corresponding camera interface. Besides, processing of these images may be performed and processing information may be generated, such as sorting information or good/bad signals. Such an evaluation system can also be integrated in the image recording device itself or be installed externally.

In a further method, the triggering image recording takes place by the image recording device, that is to say in particular by the same image recording device, which also records the inspection image. In this method, a self-triggering of the camera is proposed by a particular previous recording.

The trigger image recording is taken from the same container from which the inspection image is taken.

In a further method, the containers are transported separately. In particular, the containers are transported at a predetermined distance from each other and in particular with a distance from each other which is smaller than the cross section of a container.

Therefore, the image recording device records both the trigger image and the inspection image.

In a further method, the trigger image recording and the inspection image recording differ in at least one parameter being characteristic for the image recording. This means that, in particular, technical parameters for the image recording are changed and no image being substantially identical regarding the image recording is taken twice.

The parameter being characteristic for the image recording is in particular understood to be a parameter which is characteristic for the properties of the image recording device and in particular a refresh rate or a parameter that influences the same. In a method, the parameter is selected from a group of parameters containing a resolution of the recorded image, a size of the recorded image, a data size of the recorded image, an area size of the recorded area of the container, a color depth of the recorded image, an image refresh rate, an illumination parameter such as illuminance, color or direction, and the like.

A parameter is chosen for the trigger image, which allows a higher image refresh rate. For example, it is possible for the trigger image to be taken at a lower resolution. However, it would also be possible and/or additionally possible for a smaller area of the container to be taken for the triggering image.

As mentioned, the different parameters allow a different refresh rate. In this way, it is possible that the further inspection image can be taken immediately after taking the trigger image. This can then be recorded again with an increased or also a maximum resolution.

It would also be conceivable that during a time period corresponding to a certain geometric dimension of the containers, about half a container diameter, the further inspection image is taken.

In a further method, the inspection image recording is controlled taking into account a transport speed of the containers. Thus, first of all the triggering image is taken and based on the triggering image, the actual image recording is controlled or triggered by the transport speed and/or the instantaneous position of the container.

In a further method, the container is illuminated at least temporarily during the recording of at least the inspection image and/or during the trigger image recording. In this way, the image recording itself can be improved or even been taken a recording under defined conditions. This can be advantageous in particular with constantly increasing transport speeds. In these cases, the image recording device must cope with ever shorter image opening times. These ever-shorter times can be at least partially compensated by correspondingly stronger illumination.

In a further method, the container is illuminated in a pulsed manner during the recording of the inspection image. Thus, a flash lamp control can be installed, which acts upon the container with a flash light so as to illuminate the container while recording the image.

In the process, this illumination or this light pulse is also controlled in consideration of the triggering image. Thus, the triggering image can in particular directly cause controlling of the illumination device, but an indirect controlling would also be possible, in particular via the control of the image recording device. Conversely, it would also be possible for the recording of the inspection image to be triggered, for example, by a light pulse. Also in this case, however, the inspection image recording is triggered in particular indirectly by the trigger image recording.

Furthermore, it would also be conceivable that the container is illuminated with continuous light for the trigger recording.

In a further method, a position of the container is detected temporally and/or locally for the implementation of the trigger recording. In this case, it is possible that a position and in particular at least one coarse position of the container on the transport device is detected even before performing of the trigger recording.

For example, light barriers may be provided for this purpose. Thus, it is possible that a light barrier initially detects the approximate location of the container, then the image recording device performs a trigger recording and, based on this trigger recording, the actual inspection image is finally taken by the image recording device. Advantageously, therefore, such a light barrier arrangement is arranged in the transport direction of the containers prior to the image recording device and may be a basis for the trigger recordings of several independent camera systems which may be distributed locally.

In a further method, the triggering of the recording of the inspection image takes place taking into account a triggering condition, wherein this triggering condition is selected from a group of triggering conditions, which contains a change of the average brightness in a trigger image section, a change of a contrast of the individual pixels in an image section, a change in a variance and/or spatial frequency of the image brightnesses of individual pixels, the detection of a specific pattern and/or the detection of a specific color.

For example, it would be possible for the image recording device to be set to detect a specific element of a label and to determine the exact position of the container on the transport device on the basis of the position or the detected position of this feature. On the basis of this data, the increments or even the time after which the actual image is triggered can be calculated.

Embodiments of the present invention is further directed to an apparatus for inspecting containers, which has a transport device which transports the containers along a predetermined transport path.

Furthermore, the apparatus has a first image recording device which is suitable and intended to receive at least one spatially resolved inspection image of at least one region of a container during the transport of the containers, wherein the apparatus has a triggering device which is suitable and intended to control the triggering of the inspection image recording of the spatially resolved image.

According to embodiments of the invention, this triggering device has at least one image recording device and in particular the first image recording device, which is suitable and intended to record a triggering image of the container during the transport of the container.

The image recording device is therefore suitable and intended to take an image of the container also during its movement.

In a embodiment, the transport device has a conveyor belt on which the containers are conveyed in an upright position. However, it would also be conceivable that the transport device has one or two side guide belts between which containers can be conveyed.

In a further embodiment, the transport device has a motor and in particular an electric motor drive. Advantageously, the transport device also has a control device for controlling the transport device and in particular for controlling the drive device of the transport belt. Advantageously, the drive device has a stepper motor or a motor whose rotational position can be detected. Advantageously, the transport device has a detection device which can detect at least one position of a component of the transport device, for example a position of a conveyor belt.

In a further embodiment, the triggering device also takes into account a transport speed and/or a position of the containers on the conveyor belt.

In a further embodiment, the image recording device is switchable between at least two image recording modes, wherein in a first image recording mode, the inspection image is recordable and in a second image recording mode, the trigger image. As mentioned above, these triggering modes differ in at least one property such as image resolution or the like.

In a further embodiment, the apparatus has a further detection device, which is suitable and intended to detect a position of the container along the transport path. Advantageously, this further detection device is arranged in the movement device of the containers upstream of the image recording device. This further detection device can in particular serve to at least roughly predetermine a geometric position of the containers before they reach the image recording device or the recording region of the image recording device. However, this further detection device is not used to trigger the inspection image recording directly. This detection device has at least one detection sensor such as a light barrier.

In a further embodiment, the apparatus has at least one illumination device which is suitable and intended to illuminate the containers at least during an image recording. In this case, this illumination device may have a plurality of light sources, for example a plurality of LEDs. Furthermore, it is possible that this illumination device is arranged with respect to the transport path of the containers such that the containers are transilluminated or the containers are conveyed between the image recording device and the illumination device.

However, it would also be possible for the illumination device to be arranged such that the containers are illuminated in the incident light method (incident light process). Thus, the illumination device could be arranged on the same side as the image recording device with respect to the transport path of the containers.

In general, it is possible that the image processing device itself generates a (in particular highly accurate) trigger signal and in this way the external trigger unit, which is customary in the conventional art, can be omitted. This can, as mentioned above, for example take place in that the image recording device (or a master camera in a synchronous multi camera system) records in a free-running manner sub-images at high frequency, for example 500 Hz, in one image section, which is small compared to the entire chip area of the image sensor, and check them for compliance with a trigger condition.

It is likewise possible for the trigger signal, which is generated with high precision by the image processing device, to be transferred temporally and/or locally delayed to one or more downstream image recording devices. This advantageously makes it possible to omit additional trigger illumination possibly being necessary in the master system.

By selecting a horizontal and vertical position of the image section on the sensor surface, the triggering can also be easily adapted (for example also using a computer program) to different objects to be triggered.

The image portion is at most half as large as the entire chip area of the image sensor, it is at most 25% of this chip area, at most 10% of this chip area.

This readout and evaluation of the trigger condition can be made hardware-based in the camera itself or in an image evaluation system being designed for that purpose. In this case, an evaluation in a range of a few µs is possible and thus faster and in a higher degree of temporal determinism, compared to an external trigger solution.

As soon as the trigger condition is fulfilled, the image recording of the camera is triggered, which, however, can also take place by a specific time offset.

If the image recording device has associated with it one or more slave cameras and/or illumination in flash mode, this trigger signal can also be passed through a correspondingly fast interface to these units, since the image recording devices and flash illumination should be triggered practically at the same time, so typically with a maximum offset in the single-digit µs range.

In general, a decrease or increase in the average brightness in a trigger image section can take place or be present above or below a defined absolute threshold value or by more than a defined step height.

A drop or increase in a contrast of the image brightnesses of the individual pixels in one image section can also be used, for example, in order to approach a light-dark edge trigger. In this case, for example, it can be triggered selectively on a horizontal edge, such as a label edge or a vertical edge, such as in a lying bottle.

In addition, as mentioned above, a drop or increase in the variance and/or the spatial frequency of the image brightnesses can be used, for example in order to trigger on a 1D or 2D code, which usually has very high and locally rapidly changing contrasts.

In addition, within the scope of the conditions, a specific pattern can also be recognized by a simple pattern comparison.

In addition, a specific color or color in a color subspace can be detected.

These procedures are not limited to one image section, it is also possible to evaluate a plurality of sections or a plurality of such methods and to link the individual results, in particular logically linked, so as to generate the trigger conditions. This could be advantageous in sorting, for example, containers of different formats, which pass through the image processing unit in a mixed manner.

In order to on the one hand enable a triggering of the free-running image recording in the image section at a high frequency and on the other hand to enable a triggered recording of an overall picture, it is possible, as mentioned above, to provide both a trigger illumination and a main illumination.

Thus, for example, an illumination can be provided in continuous or switched continuous light, which is active in incoming containers.

This illumination serves both as a trigger illumination and as the main illumination.

In addition, a flashable illumination could be provided, for example a transmitted-light illumination, which permanently illuminates a defined area on this illumination or even the entire illumination area as trigger illumination. This continuous illumination can shine with significantly reduced brightness, especially if this is sufficient for the triggering.

In addition to a flashable main illumination, a trigger illumination can also be installed in a continuous illumination, which is particularly suitable for incident-light machine-vision systems. It is possible that the trigger illumination and the vision light already differ in the type of illumination, for example that in one case incident light and in the other case transmitted light is used. These illumination sources can also differ in different wavelengths, colors or the like.

As a result of the procedure according to embodiments of the invention, significantly more flexible trigger conditions are achieved compared with an external triggering solution which is based, for example, on light barriers. Light barriers can usually only react to contrast changes.

In addition, less effort for mechanics, encoders, trigger sensors, cabling and adjustment and thus a cost saving is enabled. Also, a more accurate and faster triggering can be made possible in a simple way.

In addition, no mechanical adjustment of the trigger unit or multiple sensors in a format change is required.

By selecting a trigger image section in the transport direction of the container, only the position of the object in the camera image has to be varied. Furthermore, increased reliability is achieved and thus an increase in system efficiency, since, for example, a failure of the trigger sensors, insufficient maintenance of the sensors or the tracking system no longer affect the system availability.

In addition, a trigger signal originating from a machine-vision system according to embodiments of the invention can also be delayed, for example by a tracking system and path increments, and can be made available to an inspection system being situated downstream.

In a further embodiment, the apparatus has a discharge device which is suitable and intended to discharge certain containers from a transport path or product path.

BRIEF DESCRIPTION

Some of the embodiments will be described in detail, with references to the following Figures, wherein like designations denote like members, wherein.

DETAILED DESCRIPTION

Figure 1:
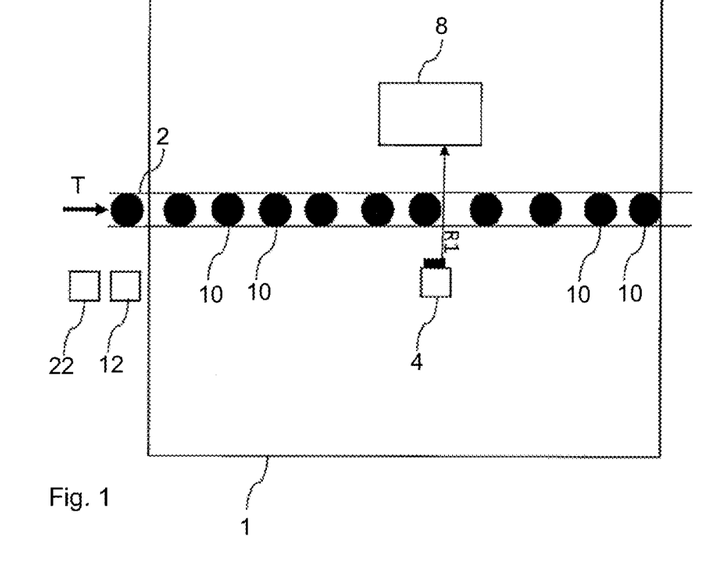
FIG. 1 is a schematic illustration of an apparatus according to embodiments of the invention.

FIG. 1 shows a schematic illustration of an apparatus 1 according to embodiments of the invention for inspecting containers. Here, containers 10 are transported by a transport device 2 along a predetermined transport path T. Here, the transport device 2 has a conveyor belt on which the containers are conveyed.

Reference numeral 4 indicates an image recording device, which observes the containers being transported in the transport direction T. This image recording device 4 takes a spatially resolved image of the individual containers.

Reference numeral 8 indicates an illumination device, which is here with respect to the individual containers 10 arranged on the opposite side of the image capture device 4.

The reference numeral R1 roughly indicates the trigger condition. If this comes into effect, the image recording is triggered by the image recording device 4.

Reference numeral 12 indicates another light barrier, which detects the entrance of containers 10 in the apparatus 1 according to embodiments of the invention. Reference numeral 22 indicates a control device and in particular a rotary encoder, by which a position of the transport device or a rotational position of the drive of deflection pulleys of the transport device can be detected. These data are also taken into account in order to trigger an image recording by the image recording device 4.

Figure 2:
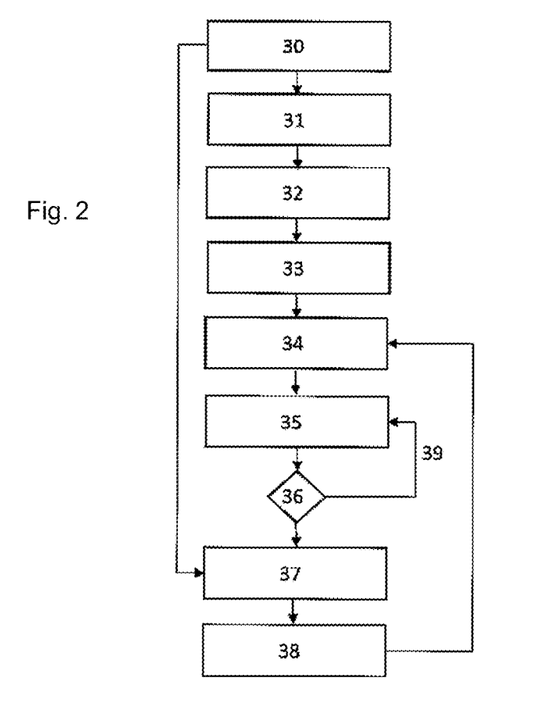
FIG. 2 is an illustration of a course of a method according to embodiments of the invention.

FIG. 2 shows a schematic course of a method according to embodiments of the invention. First, in a step 30 a live camera is started. In a process step 31 the container is placed in a center of the picture. Furthermore, in a step 32 a trigger and optionally also a picture section is defined. However, the complete picture can also be evaluated for the actual recording. In a step 33 a trigger condition is defined or learned. In a step 34 a trigger condition can be activated. In a step 35 it is checked, for example by a high-speed recording in a small trigger section, whether the trigger condition is fulfilled. If the trigger condition is fulfilled (step 36), a picture recording of an entire picture or an image section is triggered. If the trigger condition 36 is not fulfilled, an image recording is again triggered following the step 35. That is, this loop is run through until the trigger condition is fulfilled.

After recording the image in step 37, the image is transmitted (step 38) (e.g. to a sorting unit).

Figure 3:
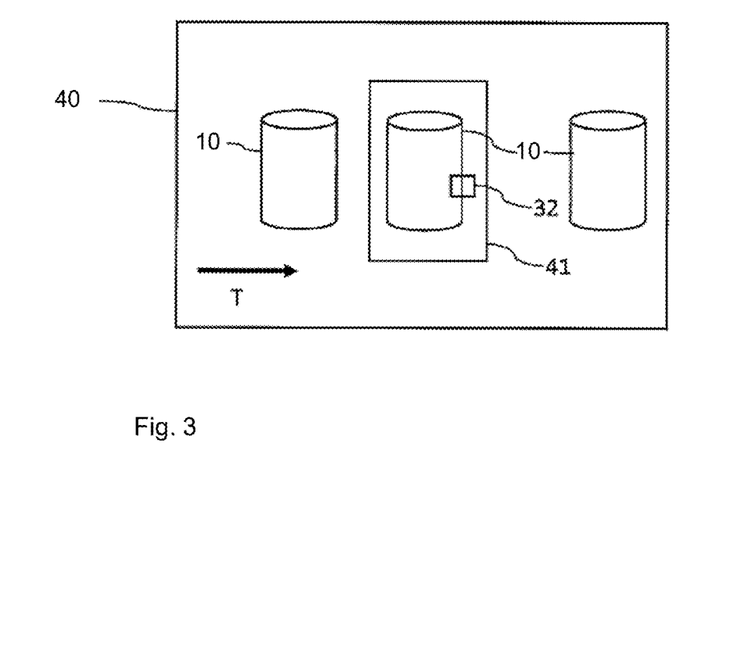
FIG. 3 is an illustration for explaining image recording.

FIG. 3 shows an illustration for creating an image recording. In this case, the reference numeral 40 refers to an overall picture which possibly has to be taken. The reference numeral 41 refers to the recording of an image section, in particular an image section, which contains a specific image. Within and/or outside of this image, the trigger condition can be defined, such as an area of the image that is particularly suitable for a trigger evaluation.

In this way, the trigger image is much smaller than the later recorded image, whereby in particular also a high refresh rate is made possible. It is conceivable for the image recording device to record images or trigger images at a refresh rate of up to several kHz. The image recording device may repeat the trigger recordings until the object is "captured" or located at an appropriate location.

If the trigger condition is fulfilled, the inspection image recording is performed. In this case, the inspection image recording is not limited to a picture, but may also comprise a multi-image recording, particularly with switching of the illumination direction or type of illumination.

Figure 4:
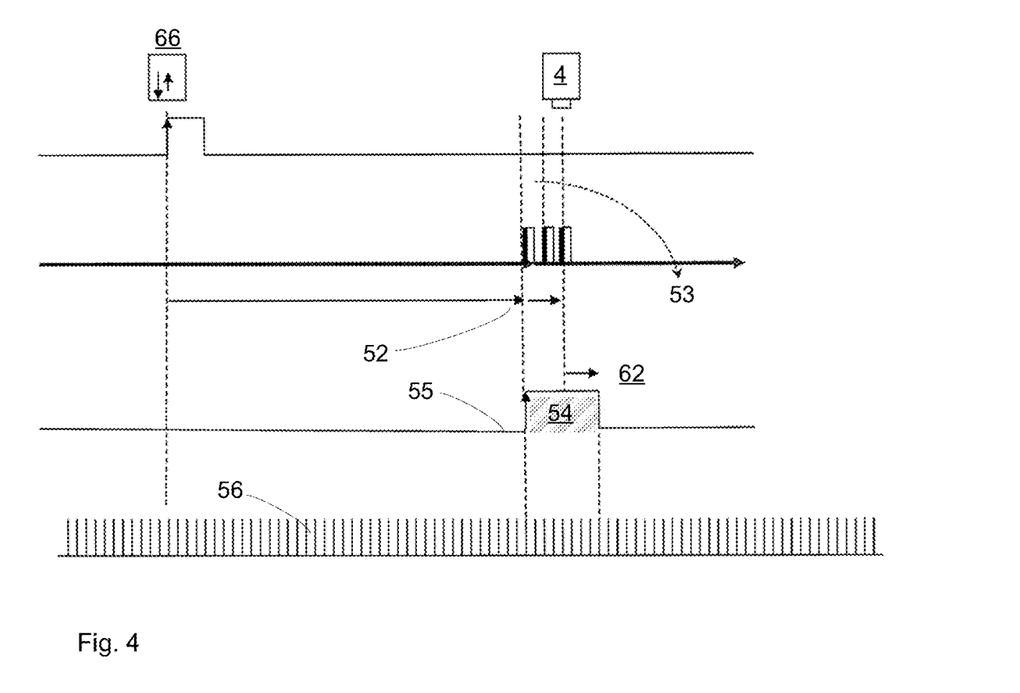
FIG. 4 is an illustration of the course of the method according to embodiments of the invention.

FIG. 4 shows a further embodiment of a method according to embodiments of the invention. Here it first of all roughly determined by a trigger light barrier 66, whether a container is in a particular area which is situated before the actual image recording device 4. In this case, there can be a container frequency, for example at 72,000 containers per hour, that is, a refresh frequency from one container to the next can be at 20 Hz.

Hence, between two containers there is a time interval of about 50 ms. Once the position of a particular container has been detected, the path to the approximate position 52 of the image recording device can be determined by high-frequency pulses 56. The high-frequency pulses are determined by the encoder connected to the conveyor belt. The way from the trigger light barrier 66 to the approximate image recording device 4 is in FIG. 4 exemplified with 39 high-frequency pulses.

Starting from point 52, it will be proceeded like described in FIG. 3, i.e. by (high-frequency 53) trigger image recording the exact position of the container before the image recording device 62 is determined, in order to perform one or more inspection image recordings as soon as this position is achieved.

The reference number 54 indicates the area in which an illumination device and/or the image recording device is activated, for example in order to deactivate the illumination device in the period not being required, i.e. before and after 54, and thus to reduce the power consumption or heat development of the illumination source(s).

The image recording device has an exposure time which may be greater than 1 µs, greater than 3 µs, greater than 5 µs, or greater than 10 µs. An exposure time is selected which may be less than 1 s, less than 800 µs, less than 500 µs, less than 300 µs, less than 200 µs, or less than 100 µs.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE NUMERALS 1 apparatus
2 transport device
4 image recording device
8 illumination device
10 containers
12 light barrier
22 control device
30-35 process steps
37-39 process steps
36 trigger condition
40 overall image
41 Recording of the image section
52 approximate position
53 high-frequency trigger image recordings
54 area where the illumination device is activated
55 area
56 high frequency pulses
62 image recording device
64 end of expectation area
66 roughly detected container; trigger light barrier
R1 trigger condition
T transport path

The invention claimed is:

1. A method for inspecting a container, wherein the container is a bottle, beverage can, or packaging for a bottle or beverage can, comprising:
   conveying the container along a predetermined transport path by a transport device, and
   taking at least one locally resolved inspection image of at least one area of the container during transport of the container by an image recording device,
   wherein a triggering of the inspection image recording of the at least one locally resolved inspection image is controlled without user input, wherein the controlling takes place based on a triggering image recording of an image of the container, wherein the triggering image recording is carried out by the image recording device without user input, wherein the triggering image recording includes information regarding a position of the container during the conveying, wherein the triggering image recording and the inspection image recording differ at least in terms of a parameter being characteristic for the respective image recording, and
   wherein at least one container per second is inspected.

2. The method according to claim 1, wherein the inspection image recording is controlled based on a transport speed and/or a path of the container.

3. The method according to claim 1, wherein the container is illuminated at least at times during the recording of the inspection image and/or during the triggering image recording.

4. The method according to claim 3, wherein the container is illuminated in a pulsed manner during the recording of the inspection image.

5. The method according to claim 1, wherein a position of the container is detected at a time and/or at a location prior to the performance of the triggering image recording.

6. The method according to claim 1, wherein the triggering of the inspection image recording takes place based on a triggering condition, wherein the triggering condition is selected from the group consisting of a change of the average brightness in a trigger image section, a change of a contrast of individual pixels in an image section, a change in the variance and/or spatial frequency of the image brightnesses of individual pixels, a detection of a specific pattern, and a detection of a specific color.

7. The method according to claim 6, wherein a plurality of triggering image recordings are performed and the inspection image recording is only captured when the triggering condition is fulfilled.

8. The method according to claim 7, wherein the plurality of triggering image recordings is repeated.

9. The method according to claim 8, wherein the plurality of triggering image recordings is repeated cyclically until the triggering condition is fulfilled.

10. An apparatus for inspection of a container, wherein the container is a bottle, beverage can, or packaging for a bottle or beverage can, wherein a transport device transports the container along a predefined transport path, comprising:
    an image recording device to take at least one locally resolved inspection image of at least one area of the container during transport of the container, and
    a triggering device to automatically control the triggering of the inspection image recording of the locally resolved inspection image, wherein the triggering device controls the triggering of the inspection image recording based on a triggering image of the container during transport of the container and without user input, wherein the triggering image of the container includes information regarding a position of the container during transport of the container along the predefined transport path, wherein the triggering image recording is carried out by the image recording device without user input, wherein the triggering image recording and the inspection image recording differ at least in terms of a parameter being characteristic for the respective image recording, and wherein at least one container per second is inspected.

11. The apparatus according to claim 10, wherein the apparatus has at least one illumination device to illuminate the containers at least during an image recording.

12. The apparatus according to claim 10, wherein the image recording device is switchable between at least a first image recording mode and a second image recording mod, wherein in the first image recording mode the inspection image is able to be recorded and in the second image recording mode the triggering image is able to be recorded.

13. The apparatus according to claim 10, wherein the apparatus has a detection device to detect a position of the container along the transport path.

14. The apparatus according to claim 10, further comprising a tracking unit, wherein the tracking unit delays the triggering of the inspection image recording by a predetermined number of path increments.

15. The apparatus according to claim 14, wherein the tracking unit is configured to delay the triggering of the inspection image recording by a first number of path increments when the container has a first diameter and by a second number of path increments when the container has a second diameter.

16. A method for inspecting containers, wherein the containers include bottles, beverage cans, or packaging for bottles or beverage cans, wherein the containers are conveyed along a predetermined transport path by a transport device at speeds of at least 10,000 containers per hour, the method comprising:

capturing a triggering image recording of at least a portion of the predetermined transport path, wherein the triggering image recording is captured without user input; and checking whether a trigger condition is fulfilled in the captured triggering image recording, wherein the trigger condition includes a position of at least one container being conveyed along the predetermined transport path;

wherein, when the trigger condition is fulfilled, an inspection image recording is captured, and when the trigger condition is not fulfilled, a further triggering image recording of the at least a portion of the predetermined transport path is captured, and wherein the triggering image recording and the inspection image recording differ at least in terms of a parameter.

17. The method according to claim 16, wherein when the trigger condition is fulfilled and an inspection image recording is captured, at least one of a camera and a light source are switched off for a period of time.

18. The method according to claim 16, wherein a loop is performed until the trigger condition is fulfilled.

19. The method according to claim 16, wherein the triggering image recording and the inspection image recording are both captured by a camera.

20. The method according to claim 16, wherein the parameter is selected from the group consisting of: a resolution of the recorded image, a size of the recorded area of the container, a color depth of the recorded image, a refresh rate, an illumination parameter, an illumination color, a direction of illumination, an exposure time, an offset, a location, and a shooting mode.

21. The method according to claim 16, wherein the containers are conveyed along the predetermined transport path synchronously.

22. The method according to claim 16, wherein the trigger condition is located within a subset of the recorded area of the inspection image recording such that the trigger image is smaller than the inspection image recording.

23. The method according to claim 22, wherein the refresh rate of the automatically captured triggering image recording is at least 500 Hz.

* * * * *